(12) United States Patent
Kapoor et al.

(10) Patent No.: US 10,917,479 B2
(45) Date of Patent: Feb. 9, 2021

(54) SYSTEM AND METHOD FOR ATTRIBUTE BASED DEVICE AND SERVICE DISCOVERY

(71) Applicant: International Business Machines Corporation, Armonk, NY (US)

(72) Inventors: Shalini Kapoor, Karnataka (IN); Amit M. Mangalvedkar, Karnataka (IN); Shachi Sharma, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/545,515

(22) Filed: Aug. 20, 2019

(65) Prior Publication Data

US 2019/0373066 A1    Dec. 5, 2019

Related U.S. Application Data

(63) Continuation of application No. 15/362,978, filed on Nov. 29, 2016, now abandoned.

(51) Int. Cl.
*H04L 29/08* (2006.01)
*G06F 16/903* (2019.01)
*H04W 4/70* (2018.01)
*H04L 12/721* (2013.01)

(52) U.S. Cl.
CPC ........ *H04L 67/16* (2013.01); *G06F 16/90335* (2019.01); *H04L 67/10* (2013.01); *H04W 4/70* (2018.02); *H04L 45/32* (2013.01)

(58) Field of Classification Search
None
See application file for complete search history.

(56) References Cited

U.S. PATENT DOCUMENTS

| | | |
|---|---|---|
| 7,181,442 B2 | 2/2007 | Yeh et al. |
| 8,831,660 B2 | 9/2014 | Jonker et al. |
| 9,491,035 B1 | 1/2016 | Pauley |
| 9,763,228 B2 | 9/2017 | Abraham et al. |
| 9,955,421 B2 | 4/2018 | Patil et al. |

(Continued)

FOREIGN PATENT DOCUMENTS

EP    3043273 A1    7/2016

OTHER PUBLICATIONS

Paganelli et al., "A DHT-Based Discovery Service for the Internet of Things," Journal of Computer Networks and Communications, vol. 2012 (2012), Article ID 107041, 11 pages, http://dx.doi.org/10.1155/2012/07041, Copyright 2012.

(Continued)

*Primary Examiner* — Scott B Christensen
(74) *Attorney, Agent, or Firm* — L. Jeffrey Kelly

(57) ABSTRACT

A method, computer program product, and computer system for receiving, at a first node of a plurality of nodes in a distributed architecture, a request for at least one of a device and a service based upon, at least in part, an attribute of at least one of the device and the service. A query to resolve the request may be forwarded to a plurality of nodes in the distributed architecture. A probability of at least a portion of nodes of the plurality of nodes to resolve the query may be determined based upon, at least in part, a search routing mechanism. The request may be forwarded to a second node of at least the portion of nodes of the plurality of nodes based upon, at least in part, the second node having a higher probability to resolve the query than a third node of at least the portion of nodes of the plurality of nodes.

20 Claims, 8 Drawing Sheets

(56) References Cited

U.S. PATENT DOCUMENTS

| | | |
|---|---|---|
| 2004/0019636 A1 | 1/2004 | St. Pierre |
| 2004/0059722 A1 | 3/2004 | Yeh |
| 2005/0198333 A1 | 9/2005 | Dinges |
| 2008/0180699 A1 | 7/2008 | Selvaraj |
| 2012/0110647 A1 | 5/2012 | Guo et al. |
| 2013/0039657 A1 | 2/2013 | Julien |
| 2013/0111038 A1 | 5/2013 | Girard |
| 2013/0246607 A1 | 9/2013 | Deshmukh |
| 2013/0282703 A1 | 10/2013 | Puterman-Sobe |
| 2014/0244834 A1 | 8/2014 | Guedalia et al. |
| 2015/0296043 A1 | 10/2015 | Kim et al. |
| 2016/0150029 A1 | 5/2016 | Atreya |
| 2017/0060642 A1 | 3/2017 | Castellano |
| 2017/0083525 A1 | 3/2017 | Guney |
| 2018/0152525 A1 | 5/2018 | Kapoor |

OTHER PUBLICATIONS

Lopez et al., "Scalable Oriented-Service Architecture for Heterogeneous and Ubiquitous IoT Domains," ScienceDirect, Pervasive and Mobile Computing 00 (2013) pp. 1-23, Marcia, Spain.

Sanjay et al., "Probability-based Controlled flooding in Opportunistic Networks," 2015 (Year 2015).

https://www.hindawi.com/journals/jcnc/2012/107041/fig1/, "A DHT-Based Discovery Service for the Internet of Things", Journal of Computer Networks and Communications, Research Article, Figure 1, Accessed on Jun. 25, 2020, 2 pages.

Example Test Results (Example Subset of, e.g., 500 queries)

700

| RootNode | Service | Discovered Node Name | PC1 Node Probability | PC2 Node Probability | PC3 Node Probability | PC4 Node Probability | PC5 Node Probability | PC1 Response Time (In nano seconds) | PC2 Response Time (In nano seconds) | PC3 Response Time (In nano seconds) | PC4 Response Time (In nano seconds) | PC5 Response Time (In nano seconds) |
|---|---|---|---|---|---|---|---|---|---|---|---|---|
| PC5 | iPhone | PC4 | 0.5 | 0.5 | 0.49 | 0.51 | 0.49 | 0 | 0 | 105099 | 115767 | 0 |
| PC5 | smartpho | PC3 | 0.5 | 0.5 | 0.5 | 0.51 | 0.48 | 0 | 0 | 20941 | 0 | 0 |
| PC1 | smartpho | PC3 | 0.49 | 0.49 | 0.51 | 0.5 | 0.48 | 0 | 6717 | 98382 | 87319 | 0 |
| PC2 | iPhone | PC4 | 0.49 | 0.48 | 0.51 | 0.51 | 0.48 | 0 | 0 | 0 | 9877 | 0 |
| PC5 | iPhone5S | PC5 | 0.49 | 0.48 | 0.51 | 0.51 | 0.49 | 0 | 0 | 0 | 0 | 790 |
| PC1 | printer | PC2 | 0.48 | 0.49 | 0.5 | 0.5 | 0.49 | 0 | 28053 | 7112 | 15409 | 0 |
| PC4 | printer | PC2 | 0.47 | 0.5 | 0.49 | 0.49 | 0.48 | 114187 | 123669 | 84158 | 0 | 92851 |
| PC3 | iPhone5S | PC5 | 0.46 | 0.49 | 0.48 | 0.48 | 0.49 | 423952 | 149746 | 0 | 10273 | 442127 |
| PC1 | printer | PC2 | 0.45 | 0.5 | 0.5 | 0.48 | 0.49 | 0 | 8692 | 0 | 0 | 0 |
| PC2 | laptop | PC3 | 0.45 | 0.49 | 0.49 | 0.47 | 0.49 | 0 | 0 | 20545 | 13038 | 0 |
| PC1 | iPhone6S | PC5 | 0.44 | 0.48 | 0.48 | 0.46 | 0.5 | 0 | 6322 | 18175 | 11854 | 184911 |
| PC3 | iPhone | PC4 | 0.44 | 0.48 | 0.47 | 0.47 | 0.49 | 0 | 0 | 0 | 18966 | 9878 |
| PC1 | laptop | PC1 | 0.45 | 0.48 | 0.47 | 0.47 | 0.49 | 790 | 0 | 14619 | 20150 | 0 |
| PC5 | iPhone | PC4 | 0.45 | 0.48 | 0.46 | 0.48 | 0.48 | 0 | 0 | 11458 | 0 | 0 |
| PC5 | laptop | PC3 | 0.45 | 0.47 | 0.46 | 0.48 | 0.47 | 0 | 0 | 13829 | 7112 | 18570 |
| PC2 | iPhone5S | PC5 | 0.45 | 0.47 | 0.46 | 0.47 | 0.47 | 0 | 0 | 11063 | 0 | 0 |
| PC5 | smartpho | PC3 | 0.45 | 0.46 | 0.46 | 0.46 | 0.48 | 0 | 0 | 15014 | 8297 | 21731 |
| PC2 | iPhone5S | PC5 | 0.45 | 0.46 | 0.45 | 0.45 | 0.47 | 0 | 24497 | 0 | 18175 | 9087 |
| PC3 | scanner | PC2 | 0.45 | 0.45 | 0.46 | 0.44 | 0.47 | 0 | 0 | 15015 | 8296 | 0 |
| PC2 | smartpho | PC3 | 0.44 | 0.45 | 0.47 | 0.43 | 0.47 | 15410 | 9483 | 20546 | 0 | 0 |
| PC4 | smartpho | PC3 | 0.43 | 0.44 | 0.48 | 0.43 | 0.47 | 7112 | 0 | 12643 | 18570 | 7111 |
| PC3 | printer | PC2 | 0.43 | 0.45 | 0.47 | 0.42 | 0.46 | 0 | 27262 | 0 | 0 | 0 |
| PC1 | iPhone | PC4 | 0.42 | 0.45 | 0.46 | 0.43 | 0.45 | 0 | 0 | 9087 | 22521 | 13434 |

Continued from Fig. 7

| | | | | | | | | | | | |
|---|---|---|---|---|---|---|---|---|---|---|---|
| PC3 | iPhone | PC4 | 0.42 | 0.45 | 0.44 | 0.44 | 0 | 0 | 0 | 19360 | 10668 |
| PC3 | printer | PC2 | 0.42 | 0.46 | 0.44 | 0.43 | 0 | 15804 | 0 | 7112 | 0 |
| PC4 | iPhone6S | PC5 | 0.41 | 0.45 | 0.43 | 0.42 | 24102 | 16200 | 34375 | 20941 | 45438 |
| PC5 | printer | PC2 | 0.41 | 0.46 | 0.42 | 0.42 | 0 | 33584 | 13829 | 20941 | 0 |
| PC5 | scanner | PC2 | 0.41 | 0.47 | 0.41 | 0.41 | 0 | 28843 | 13433 | 20150 | 0 |
| PC5 | iPhone5S | PC5 | 0.41 | 0.47 | 0.4 | 0.4 | 0 | 0 | 0 | 0 | 1185 |
| PC1 | smartpha | PC3 | 0.4 | 0.46 | 0.42 | 0.44 | 0 | 8693 | 26077 | 16200 | 0 |
| PC5 | iPhone5S | PC5 | 0.4 | 0.46 | 0.42 | 0.44 | 0 | 0 | 0 | 0 | 1185 |
| PC3 | iPhone | PC4 | 0.39 | 0.45 | 0.41 | 0.44 | 31608 | 0 | 0 | 49388 | 16199 |
| PC4 | iPhone | PC4 | 0.39 | 0.45 | 0.4 | 0.44 | 0 | 0 | 0 | 1581 | 0 |
| PC4 | smartpha | PC3 | 0.38 | 0.44 | 0.41 | 0.44 | 22522 | 0 | 31214 | 0 | 0 |
| PC3 | iPhone | PC4 | 0.38 | 0.44 | 0.4 | 0.43 | 0 | 13829 | 0 | 32794 | 20151 |
| PC2 | iPhone5S | PC5 | 0.38 | 0.43 | 0.41 | 0.44 | 0 | 0 | 20941 | 11063 | 30029 |
| PC1 | printer | PC2 | 0.37 | 0.44 | 0.4 | 0.44 | 0 | 15014 | 0 | 0 | 0 |
| PC2 | printer | PC2 | 0.37 | 0.45 | 0.4 | 0.44 | 0 | 4346 | 0 | 0 | 0 |
| PC5 | scanner | PC2 | 0.37 | 0.46 | 0.39 | 0.43 | 0 | 32004 | 14224 | 22126 | 0 |
| PC2 | scanner | PC2 | 0.37 | 0.47 | 0.39 | 0.43 | 0 | 1580 | 0 | 0 | 0 |
| PC4 | smartpha | PC3 | 0.36 | 0.46 | 0.4 | 0.43 | 33585 | 24102 | 0 | 0 | 0 |
| PC3 | smartpha | PC3 | 0.35 | 0.45 | 0.41 | 0.43 | 0 | 8693 | 27263 | 16990 | 0 |
| PC1 | iPhone | PC4 | 0.34 | 0.44 | 0.41 | 0.43 | 0 | 10273 | 0 | 17385 | 0 |
| PC1 | iPhone | PC4 | 0.33 | 0.43 | 0.41 | 0.43 | 0 | 10273 | 0 | 16990 | 0 |
| PC4 | iPhone6S | PC5 | 0.32 | 0.42 | 0.4 | 0.44 | 20150 | 12246 | 27262 | 0 | 37930 |
| PC5 | printer | PC2 | 0.32 | 0.43 | 0.39 | 0.43 | 0 | 37141 | 15805 | 24102 | 0 |
| PC4 | smartpha | PC3 | 0.31 | 0.42 | 0.4 | 0.43 | 20941 | 13038 | 30818 | 0 | 0 |
| PC1 | iPhone | PC4 | 0.3 | 0.41 | 0.4 | 0.43 | 0 | 10668 | 0 | 17780 | 0 |
| PC4 | iPhone6S | PC5 | 0.29 | 0.4 | 0.39 | 0.44 | 21731 | 13039 | 29238 | 0 | 41882 |
| PC5 | printer | PC2 | 0.29 | 0.41 | 0.38 | 0.43 | 0 | 33585 | 14619 | 21336 | 0 |
| PC4 | iPhone | PC4 | 0.29 | 0.41 | 0.38 | 0.43 | 0 | 0 | 0 | 1581 | 0 |
| PC5 | smartpha | PC3 | 0.29 | 0.42 | 0.39 | 0.42 | 0 | 0 | 17385 | 0 | 0 |
| PC1 | iPhone6S | PC5 | 0.28 | 0.41 | 0.38 | 0.43 | 0 | 14224 | 31609 | 22521 | 43462 |
| PC4 | scanner | PC2 | 0.28 | 0.41 | 0.38 | 0.43 | 0 | 12643 | 0 | 0 | 0 |
| PC4 | iPhone | PC4 | 0.28 | 0.42 | 0.35 | 0.43 | 0 | 0 | 0 | 1185 | 0 |
| PC5 | printer | PC5 | 0.28 | 0.41 | 0.34 | 0.42 | 0 | 343745 | 14224 | 23707 | 0 |
| PC2 | iPhone6S | PC5 | 0.28 | 0.41 | 0.33 | 0.43 | 0 | 0 | 19755 | 10668 | 30028 |
| PC2 | printer | PC2 | 0.28 | 0.42 | 0.33 | 0.43 | 0 | 4741 | 0 | 0 | 0 |

SYSTEM AND METHOD FOR ATTRIBUTE BASED DEVICE AND SERVICE DISCOVERY

RELATED APPLICATIONS

The subject application is a continuation application of U.S. patent application Ser. No. 15/362,978, filed on Nov. 29, 2016, the entire contents of which are herein incorporated by reference.

BACKGROUND

Generally, the "Internet of Things" (IoT) may include a network of heterogeneous devices. Sometimes, searching a service or an object in the IoT network may be difficult. For example, typically, a search may require knowledge of, e.g., an identity of the end device or probable devices offering the desired service, domain name offering the service, and/or organization owning the device or service.

BRIEF SUMMARY OF DISCLOSURE

In one example implementation, a method, performed by one or more computing devices, may include but is not limited to receiving, at a first node of a plurality of nodes in a distributed architecture, a request for at least one of a device and a service based upon, at least in part, an attribute of at least one of the device and the service. A query to resolve the request may be forwarded to a plurality of nodes in the distributed architecture. A probability of at least a portion of nodes of the plurality of nodes to resolve the query may be determined based upon, at least in part, a search routing mechanism. The request may be forwarded to a second node of at least the portion of nodes of the plurality of nodes based upon, at least in part, the second node having a higher probability to resolve the query than a third node of at least the portion of nodes of the plurality of nodes.

One or more of the following example features may be included. The search routing mechanism may include a flood search routing mechanism. The flood search routing mechanism may include increasing the probability of the second node of at least the portion of nodes of the plurality of nodes to resolve the query based upon, at least in part, a successful response by the second node. The flood search routing mechanism may include decreasing the probability of a third node of at least the portion of nodes of the plurality of nodes to resolve the query based upon, at least in part, a failed response by the third node. The attribute of the device may include a service offered by the device. The attribute of the device may include at least one of a type, a location, a model, and a protocol. Each respective node of at least the portion of nodes of the plurality of nodes may include a local directory of registered devices to the respective node.

In another example implementation, a computing system may include one or more processors and one or more memories configured to perform operations that may include but are not limited to receiving, at a first node of a plurality of nodes in a distributed architecture, a request for at least one of a device and a service based upon, at least in part, an attribute of at least one of the device and the service. A query to resolve the request may be forwarded to a plurality of nodes in the distributed architecture. A probability of at least a portion of nodes of the plurality of nodes to resolve the query may be determined based upon, at least in part, a search routing mechanism. The request may be forwarded to a second node of at least the portion of nodes of the plurality of nodes based upon, at least in part, the second node having a higher probability to resolve the query than a third node of at least the portion of nodes of the plurality of nodes.

One or more of the following example features may be included. The search routing mechanism may include a flood search routing mechanism. The flood search routing mechanism may include increasing the probability of the second node of at least the portion of nodes of the plurality of nodes to resolve the query based upon, at least in part, a successful response by the second node. The flood search routing mechanism may include decreasing the probability of a third node of at least the portion of nodes of the plurality of nodes to resolve the query based upon, at least in part, a failed response by the third node. The attribute of the device may include a service offered by the device. The attribute of the device may include at least one of a type, a location, a model, and a protocol. Each respective node of at least the portion of nodes of the plurality of nodes may include a local directory of registered devices to the respective node.

In another example implementation, a computer program product may reside on a computer readable storage medium having a plurality of instructions stored thereon which, when executed across one or more processors, may cause at least a portion of the one or more processors to perform operations that may include but are not limited to receiving, at a first node of a plurality of nodes in a distributed architecture, a request for at least one of a device and a service based upon, at least in part, an attribute of at least one of the device and the service. A query to resolve the request may be forwarded to a plurality of nodes in the distributed architecture. A probability of at least a portion of nodes of the plurality of nodes to resolve the query may be determined based upon, at least in part, a search routing mechanism. The request may be forwarded to a second node of at least the portion of nodes of the plurality of nodes based upon, at least in part, the second node having a higher probability to resolve the query than a third node of at least the portion of nodes of the plurality of nodes.

One or more of the following example features may be included. The search routing mechanism may include a flood search routing mechanism. The flood search routing mechanism may include increasing the probability of the second node of at least the portion of nodes of the plurality of nodes to resolve the query based upon, at least in part, a successful response by the second node. The flood search routing mechanism may include decreasing the probability of a third node of at least the portion of nodes of the plurality of nodes to resolve the query based upon, at least in part, a failed response by the third node. The attribute of the device may include a service offered by the device. The attribute of the device may include at least one of a type, a location, a model, and a protocol. Each respective node of at least the portion of nodes of the plurality of nodes may include a local directory of registered devices to the respective node.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIGS. 7-8 is an example table of discovery node probabilities according to one or more example implementations of the disclosure.

Like reference symbols in the various drawings indicate like elements.

DETAILED DESCRIPTION

Figure 1:
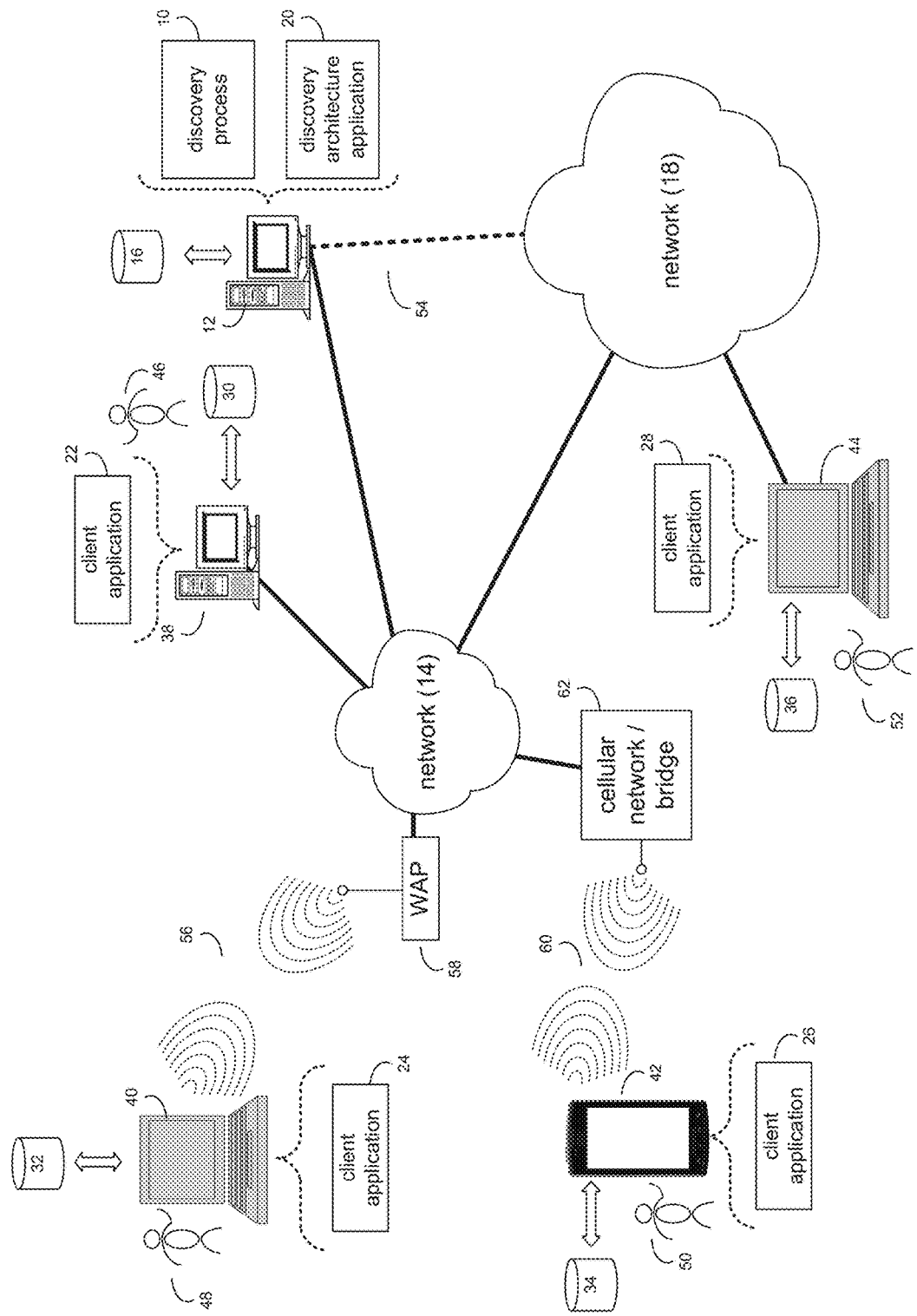
FIG. 1 is an example diagrammatic view of a discovery process coupled to an example distributed computing network according to one or more example implementations of the disclosure.

System Overview:

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or wireless network. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown discovery process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device (s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a discovery process, such as discovery process 10 of FIG. 1, may receive, at a first node of a plurality of nodes in a distributed architecture, a request for at least one of a device and a service based upon, at least in part, an attribute of at least one of the device and the service. A query to resolve the request may be forwarded to a plurality of nodes in the distributed architecture. A probability of at least a portion of nodes of the plurality of nodes to resolve the query may be determined based upon, at least in part, a search routing mechanism. The request may be forwarded to a second node of at least the portion of nodes of the plurality of nodes based upon, at least in part, the second node having a higher probability to resolve the query than a third node of at least the portion of nodes of the plurality of nodes.

In some implementations, the instruction sets and subroutines of discovery process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, discovery process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a discovery service/device architecture application (e.g., discovery architecture application 20), examples of which may include, but are not limited to, e.g., a device discovery architecture application, a service discovery architecture application, or other application that allows for the discovery of devices/services in networks, e.g., the "Internet of Things" (IoT) network. In some implementations, discovery process 10 and/or discovery architecture application 20 may be accessed via one or more of client applications 22, 24, 26, 28. In some implementations, discovery process 10 may be a standalone application, or may be an applet/application/script/extension that may interact with and/or be executed within discovery architecture application 20, a component of discovery architecture application 20, and/or one or more of client applications 22, 24, 26, 28. In some implementations, discovery architecture application 20 may be a standalone application, or may be an applet/application/script/extension that may interact with and/or be executed within discovery process 10, a component of discovery process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of discovery process 10 and/or discovery architecture application 20. Examples of client applications 22, 24, 26, 28 may include, but are not limited to, e.g., a device discovery architecture application, a service discovery architecture application, or other application that allows for the discovery of devices/services in networks, e.g., the "Internet of Things" (IoT) network, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of discovery process 10 (and vice versa). Accordingly, in some implementations, discovery process 10 may be a purely server-side application, a purely client-side application, or a hybrid server-side/client-side application that is cooperatively executed by one or more of client applications 22, 24, 26, 28 and/or discovery process 10.

In some implementations, one or more of client applications 22, 24, 26, 28 may be configured to effectuate some or all of the functionality of discovery architecture application 20 (and vice versa). Accordingly, in some implementations, discovery architecture application 20 may be a purely server-side application, a purely client-side application, or a hybrid server-side/client-side application that is cooperatively executed by one or more of client applications 22, 24, 26, 28 and/or discovery architecture application 20. As one or more of client applications 22, 24, 26, 28, discovery process 10, and discovery architecture application 20, taken singly or in any combination, may effectuate some or all of the same functionality, any description of effectuating such functionality via one or more of client applications 22, 24, 26, 28, discovery process 10, discovery architecture application 20, or combination thereof, and any described interaction(s) between one or more of client applications 22, 24, 26, 28, discovery process 10, discovery architecture application 20, or combination thereof to effectuate such functionality, should be taken as an example only and not to limit the scope of the disclosure.

In some implementations, one or more of users 46, 48, 50, 52 may access computer 12 and discovery process 10 (e.g., using one or more of client electronic devices 38, 40, 42, 44) directly through network 14 or through secondary network 18. Further, computer 12 may be connected to network 14 through secondary network 18, as illustrated with phantom link line 54. Discovery process 10 may include one or more user interfaces, such as browsers and textual or graphical user interfaces, through which users 46, 48, 50, 52 may access discovery process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
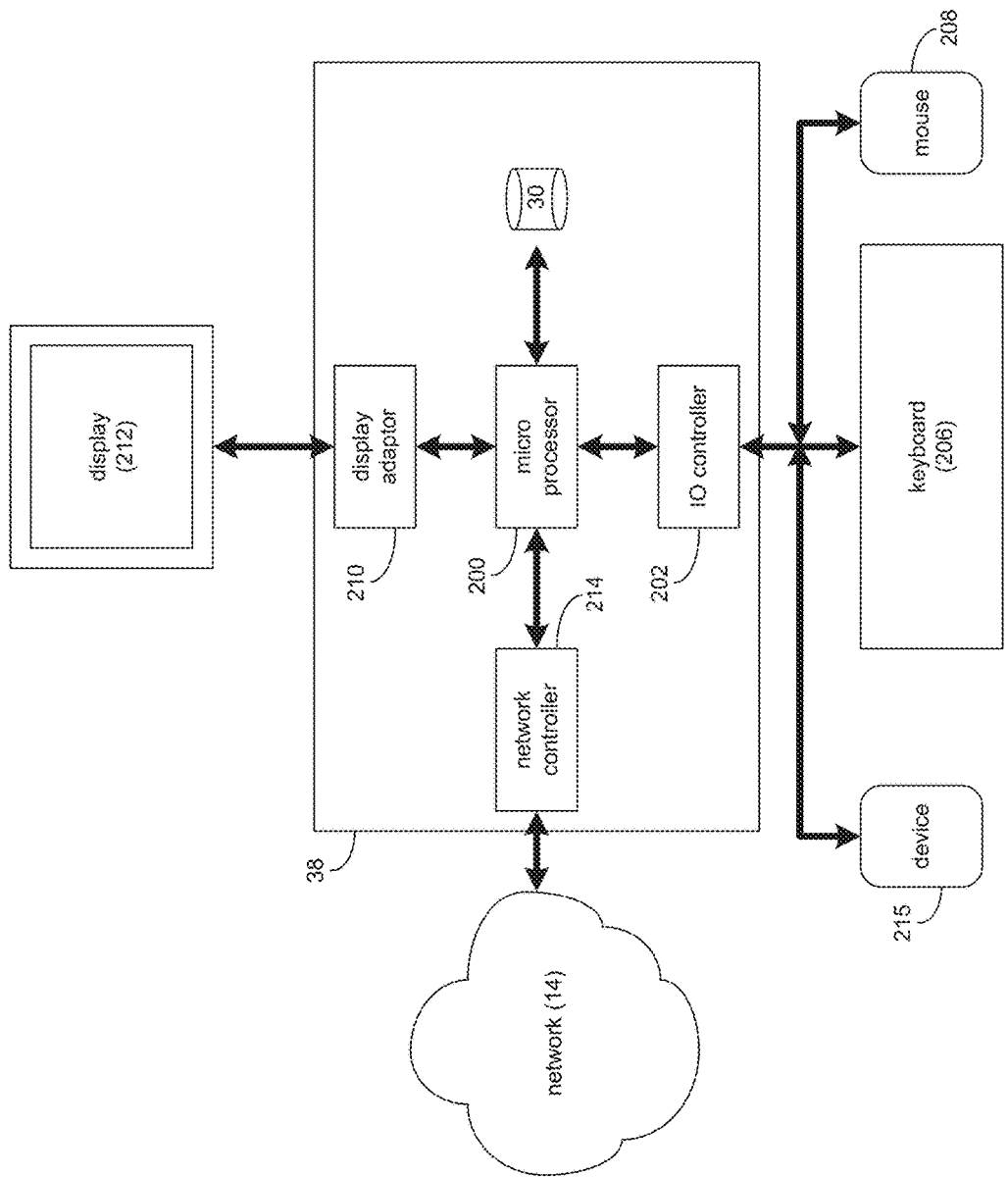
FIG. 2 is an example diagrammatic view of a client electronic device of FIG. 1 according to one or more example implementations of the disclosure.
Figure 3:
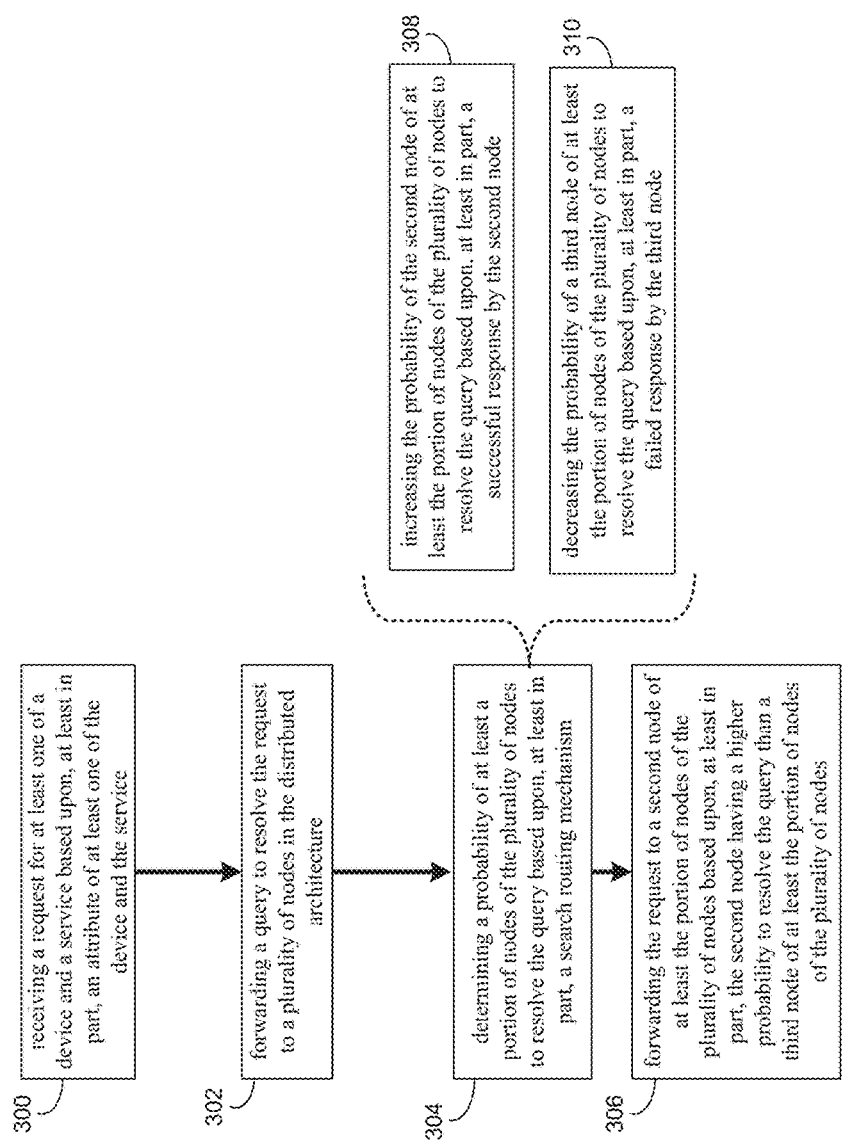
FIG. 3 is an example flowchart of a discovery process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, discovery process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As noted above, generally, the "Internet of Things" (IoT) may include a network of heterogeneous devices. Sometimes, searching a service or an object in the IoT network may be difficult. For example, typically, a search may require knowledge of, e.g., an identify of the end device or probable devices offering the desired service, domain name offering the service, and/or organization owning the devices. Additionally, known discovery service architectures may typically only work for homogeneous devices (e.g., smartphone searching for another smartphone of the owner in the network) and may not work generally for heterogeneous devices (e.g., a smart air conditioner in home searching for a smartphone of the owner in the network) and/or may only be used for device discovery without the ability for service discovery. Moreover, these known discovery service architectures may typically be manufacturer dependent (e.g., manufacturer X's smartphone searching for another of manufacturer X's smartphone of the owner in the network) and/or protocol dependent (e.g., Bluetooth™ enabled device may only be able to search for another Bluetooth™ enabled device).

Known "peer to peer" based discovery service for IoT may use a distributed hash table (DHT) and/or prefix hash tree based peer to peer discovery service architecture. Since, the architecture is peer to peer, each node may have the same capability to search for the objects/devices, by essentially dividing the hash key space using DHT. However, this may imply having prior knowledge about the attributes set (or whatever is being chosen for the key). Thus, generally, any modification to the key set (e.g., new devices joining the network) may require reconstruction of the hash table (e.g., infrastructure modifications). IoT may be considered as a rapidly changing field where new low cost devices are quickly coming up in the market, which may require reconstruction of the hash table each time a new device is added.

As will be discussed below, in some implementations, discovery process 10 may at least help, e.g., improve a technology necessarily rooted in computer technology in order to overcome one or more example issues specifically arising in the realm of computer networks, by improving existing technological processes associated with, e.g., device/service discovery, e.g., using attributes in a distributed network.

The Discovery Process:

As discussed above and referring also at least to the example implementations of FIGS. 3-8, discovery process 10 may receive 300, at a first node of a plurality of nodes in a distributed architecture, a request for at least one of a device and a service based upon, at least in part, an attribute of at least one of the device and the service. Discovery process 10 may forward 302 a query to resolve the request to a plurality of nodes in the distributed architecture. Discovery process 10 may determine 304 a probability of at least a portion of nodes of the plurality of nodes to resolve the query based upon, at least in part, a search routing mechanism. Discovery process 10 may forward 306 the request to a second node of at least the portion of nodes of the plurality of nodes based upon, at least in part, the second node having a higher probability to resolve the query than a third node of at least the portion of nodes of the plurality of nodes.

Figure 4:
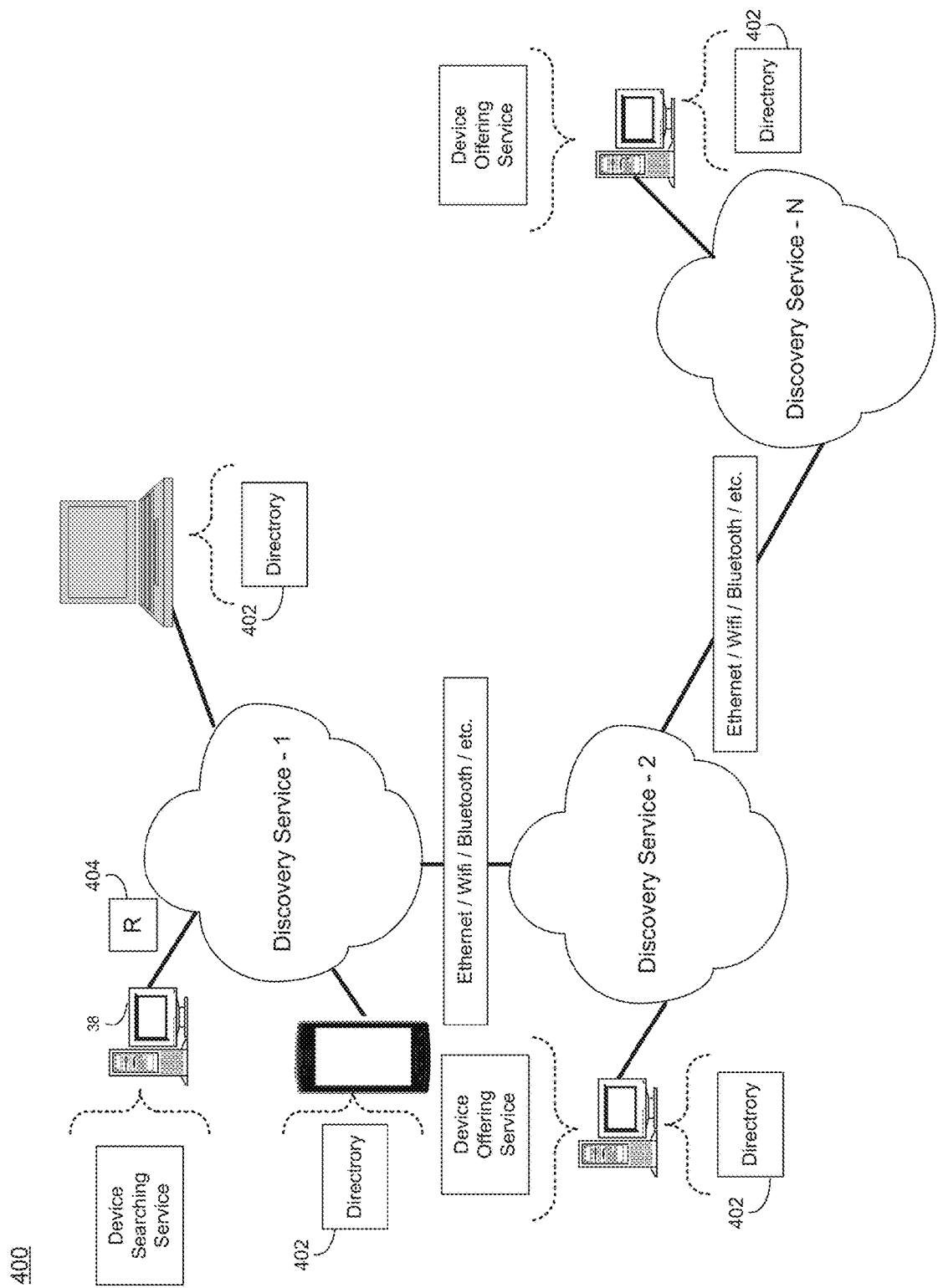
FIG. 4 is an example diagrammatic view of a discovery process coupled to an example distributed computing network according to one or more example implementations of the disclosure.
Figure 5:
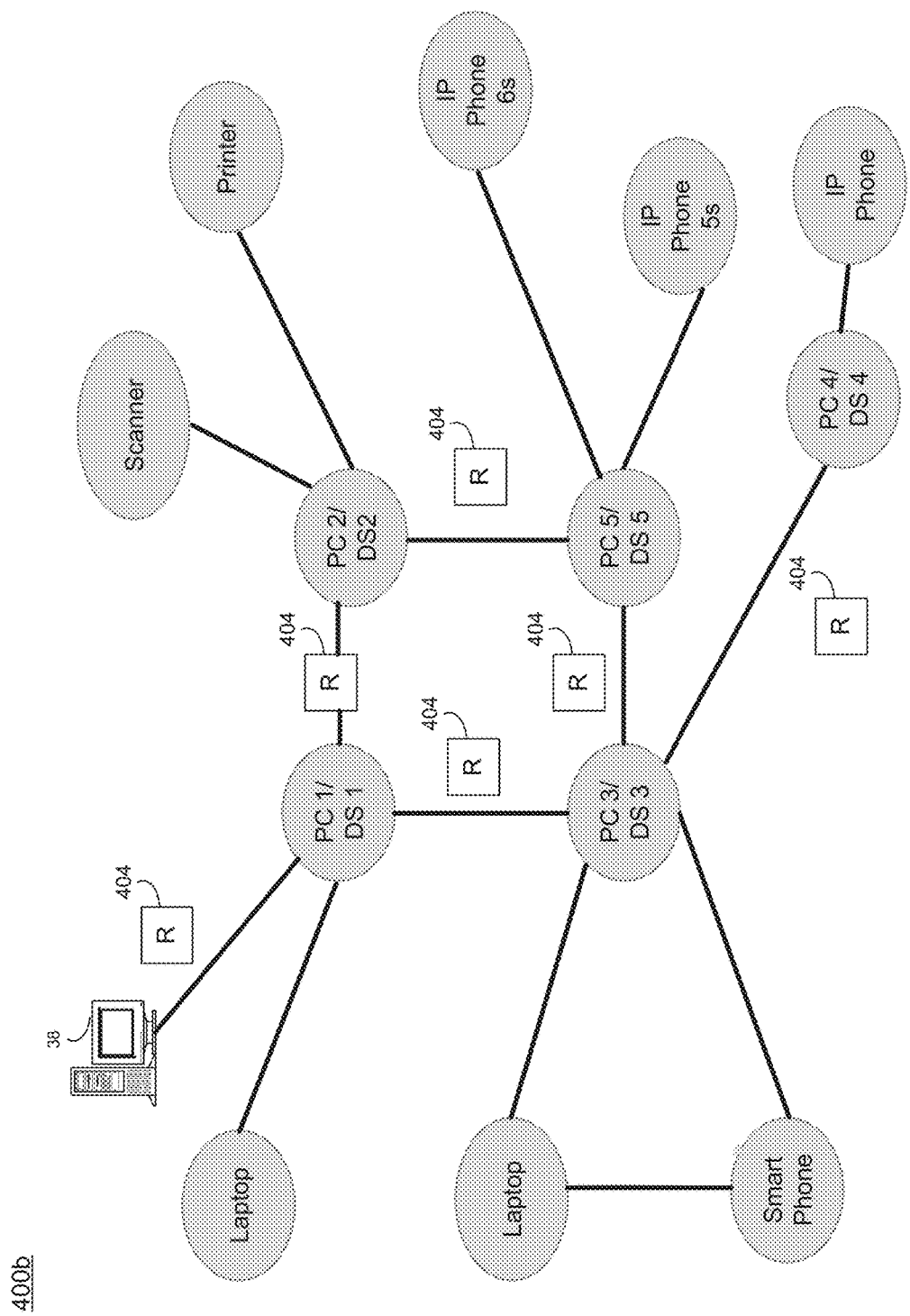
FIG. 5 is an example diagrammatic view of a discovery process coupled to an example distributed computing network according to one or more example implementations of the disclosure.
Figure 6:
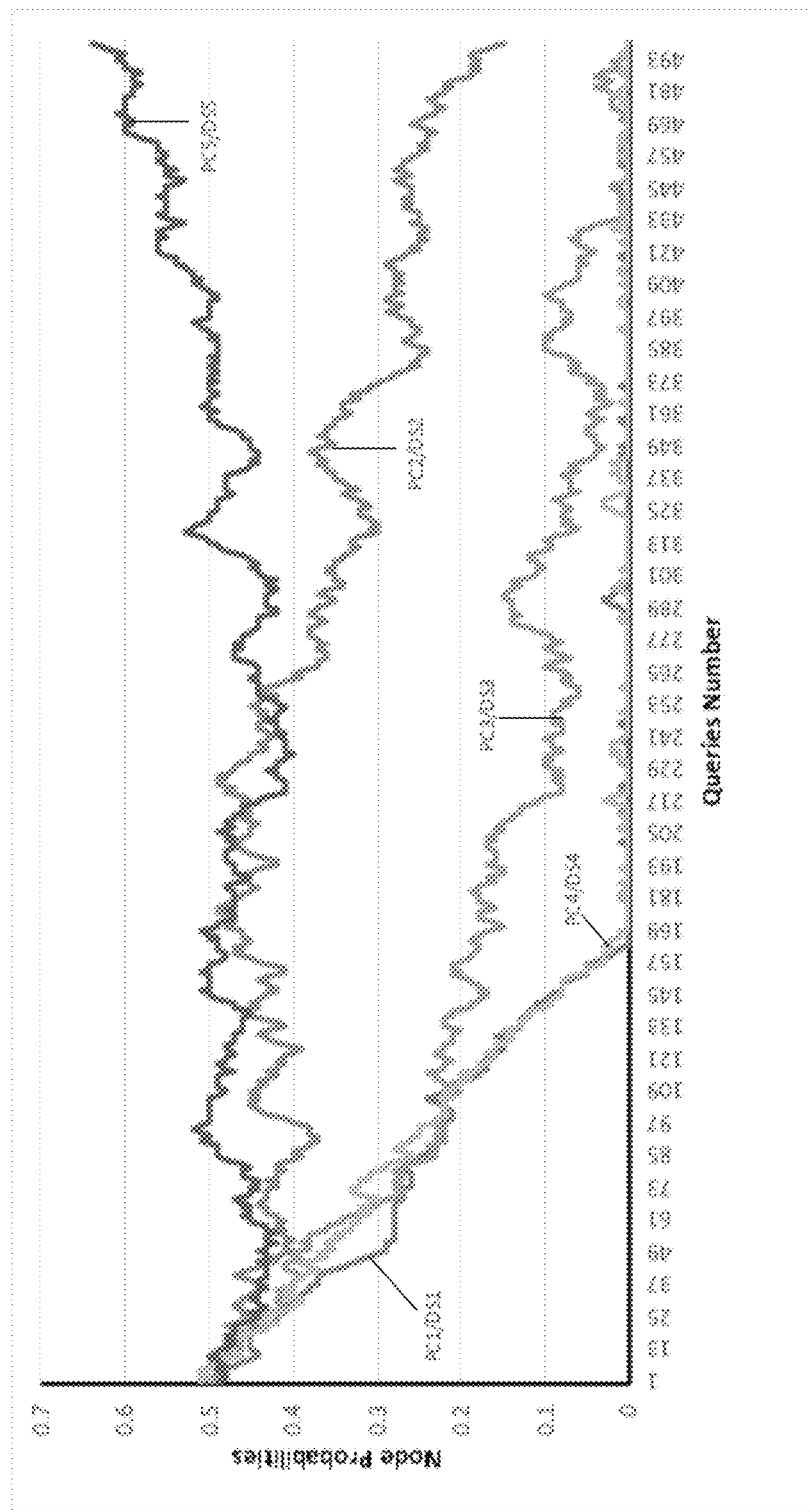
FIG. 6 is an example chart of discovery node probabilities according to one or more example implementations of the disclosure.

In some implementations, and referring at least to the example implementations of FIGS. 1, 4, and/or 5, an example distributed architecture 400 (as opposed to a monolithic directory at a single computing device) is shown. In the example, distributed architecture 400 may include multiple discovery Service (DS) nodes and multiple computing devices operatively connected to the DS nodes. In some implementations, each DS node (e.g., via the respective computing devices) may include a local directory (e.g., directory 402) of objects (e.g., devices) and/or services registered to them. In some implementations, the local directory may contain information about similar devices and/or dissimilar devices. In some implementations, the objects may be registered to the local directory using, e.g., the object's attributes such as type, location, model, service offered, protocol, etc. The process of registration of objects to DS is known to those skilled in the art and may be automatic or manual. In the example, one or more of the local directories may be connected together over a network (as shown in FIG. 1 using the example wired or wireless connections).

In some implementations, rather than having only a local discovery method or mechanism which may be limited to the IoT application server, discovery process 10 (using the example distributed architecture) may provide a global method or mechanism that may allow one device to search another device in the network using multiple nodes, e.g., a home air conditioner may be able to find the mobile phone of the owner in their work office over a network (or Internet). In some implementations, by adopting a distributed architecture, discovery process 10 may essentially offload the task of managing different device types/protocol types (or other attributes) onto different nodes. One or more DS nodes in distributed architecture 400 may be responsible for maintaining the protocols/devices (or other attributes) in its domain/neighborhood in a local directory or other organization method, which may be stored and maintained, e.g., in a data store via a storage device. It will be appreciated that alternative distributed architectures and more/less DS nodes may be used without departing from the scope of the disclosure. As such, the specific examples shown at FIG. 1, FIG. 4, and FIG. 5 should be taken as example only and not to otherwise limit the scope of the disclosure.

In some implementations, discovery process 10 may receive 300, at a first node of a plurality of nodes in a distributed architecture, a request for at least one of a device and a service based upon, at least in part, an attribute of at least one of the device and the service. For instance, and referring at least to FIG. 4, assume for example purposes only that a user (e.g., user 46) desires to find a device on distributed architecture 400. In the example, user 46 (e.g., via client electronic device 38 and discovery process 10) may send a request (e.g., request 404) to a node (e.g., DS 1). In some implementations, request 404 may include, e.g., one or more attributes characterizing the requested device or service. Thus, in the example, client electronic device 38 (e.g., the object looking for a particular device) may specify one or more of the attributes characterizing the particular device (or service) to be discovered, e.g., in a message, which may be sent to and received 300 by one or more DS nodes.

In some implementations, the attribute of the device may include a service offered by the device. For example, the attribute may include, e.g., remote printer and facsimile device and service discovery, vehicle service center discovery, power supply device and service discovery, transportation device and service discovery, etc. For instance, assume for example purposes only that user 46 desires to find a device on distributed architecture 400 that has the attribute of SERVICE printer. In the example, request 404 may include, e.g., SERVICE printer in a message, which may be sent to and received 300 by one or more DS nodes.

In some implementations, the attribute of the device may include at least one of a type (e.g., camera, smartphone), a location (e.g., StonyBrooke), a model (e.g., T430, WS513), and a protocol (e.g., Bluetooth, Zigbee). For instance, assume for example purposes only that user 46 desires to find a device on distributed architecture 400 that has the attribute of TYPE camera. In the example, request 404 may include, e.g., TYPE camera in a message, which may be sent to and received 300 by one or more DS nodes. As another example, assume for example purposes only that user 46 desires to find a device on distributed architecture 400 that has the attribute of LOCATION StonyBrooke. In the example, request 404 may include, e.g., LOCATION StonyBrooke in a message, which may be sent to and received 300 by one or more DS nodes. As another example, assume for example purposes only that user 46 desires to find a device on distributed architecture 400 that has the attribute of MODEL T430. In the example, request 404 may include, e.g., MODEL T430 in a message, which may be sent to and received 300 by one or more DS nodes. As yet another example, assume for example purposes only that user 46 desires to find a device on distributed architecture 400 that has the attribute of PROTOCOL Zigbee. In the example, request 404 may include, e.g., PROTOCOL Zigbee in a message, which may be sent to and received 300 by one or more DS nodes.

In some implementations, discovery process 10 may forward 302 a query to resolve the request to a plurality of nodes in the distributed architecture. For instance, and referring at least to the example distributed architecture 400b in FIG. 5, request 404 may include, e.g., SERVICE X in a message, which may be sent to and received 300 by one or more DS nodes (e.g., DS node 1). DS node 1 (e.g., via discovery process 10) may forward 302 request 404 (e.g., as a query) to resolve the request to multiple nodes connected to distributed architecture 400b (e.g., DS 2-DS 5). In some implementations, each respective node of at least a portion of nodes of the plurality of nodes may include a local directory of registered devices to the respective node, as discussed above. In some implementations, any DS node with a directory receiving 300 request 404 for a service or device may forward 302 the request to one or more of the other DS nodes with connected local directories to be resolved.

In some implementations, discovery process 10 may determine 304 a probability of at least a portion of nodes of the plurality of nodes to resolve the query based upon, at least in part, a search routing mechanism. For example, each DS node in the distributed architecture (e.g., distributed architecture 400b) may have different probabilities of being able to resolve the above-noted query (e.g., based upon whether the respective local directory of the DS node includes the devices/services noted by the attribute(s) in the query). Thus, in some implementations, discovery process 10 may determine 304 the probability of one or more of the DS nodes in distributed architecture 400b to resolve the above-noted query.

In some implementations, the search routing mechanism may include a flood search routing mechanism. For instance, in some implementations, at least a portion of the DS nodes (e.g., via discovery process 10) may each implement a probabilistic flood search algorithm to retrieve responses from neighboring DS nodes. In certain implementations, discovery process 10 may assign equal probability to all neighboring DS nodes initially, and on each successful response probability may be increased by a reward and on each failure probability may be reduced by a penalty. For example, in some implementations, each DS node (e.g., via discovery process 10) may assign its neighbors a probability to resolve a query, and may begin by assigning some or all neighboring DS nodes equal probability, e.g., (1/n), where 'n' is the number of neighbors. In the example, the DS node (e.g., via discovery process 10) may search its local database for the device using the attributes received in the query, or may retrieve the response from the neighboring DS nodes to send the response back to the querying device.

In some implementations, the flood search routing mechanism may include discovery process 10 increasing 308 the probability of the second node of at least the portion of nodes of the plurality of nodes to resolve the query based upon, at least in part, a successful response by the second node. For instance, assume for example purposes only that DS 5 successfully responds, as the local directory of DS 5 may include a device/service associated with the attribute(s) received in the query (e.g., SERVICE X). In the example, on each successful response, discovery process 10 may increase 308 the probability of DS 5 by a reward (e.g., $0<r<1$). In some implementations, on reaching a pre-decided upper limit (e.g., 0.999), discovery process 10 may not change the value. In such example cases, the same request may be routed to DS 5 with probability equal to almost one viz. 0.999 implying that services offered by or through other neighbors are not of importance. This may also be possible when an alternate path through DS 5 for other services in the network are available and hence DS 5 has become a node with high probability. This may also imply that other neighbors may not be required and may be removed.

In some implementations, the flood search routing mechanism may include discovery process 10 decreasing 310 the probability of a third node of at least the portion of nodes of the plurality of nodes to resolve the query based upon, at least in part, a failed response by the third node. For instance, assume for example purposes only that DS 3 fails to respond that its local directory includes a device/service associated with the attribute(s) received in the query (e.g., SERVICE X). In the example, on each failed response, discovery process 10 may decrease 310 the probability of DS 3 by a penalty (e.g., $0<f<1$). In some implementations, on reaching a pre-decided lower limit (e.g., 0.001), discovery process 10 may not change the value. In some implementations, this limit may indicate that the service received in the query does not have use (at least for this particular attribute) and may be marked for deletion (e.g., the services with this neighbor may have become obsolete and thus this node may be removed as a neighbor).

In some implementations, discovery process 10 may forward 306 the request to a second node of at least the portion of nodes of the plurality of nodes based upon, at least in part, the second node having a higher probability to resolve the query than a third node of at least the portion of nodes of the plurality of nodes. For instance, referring at least to the example FIG. 6, and continuing with the example of distributed architecture 400b, a chart (e.g., chart 600) shows the probabilities of each DS node after an example number of queries (e.g., 500) using the example flood search routing mechanism. As shown in the example, DS 5 indicates the higher (and in this case highest) probability to resolve the query. Thus, in this example, discovery process 10 may forward 306 the request for the device (based upon the attribute(s) in the request) to DS 5 based upon, at least in part, DS 5 having a higher probability to resolve the query than DS 1, DS 2, DS 3, and DS 4. Thus, in the example, the query request may first be routed to DS 5. In case of failure from DS 5, the query may be sent to DS 1 and so on. In some implementations, discovery process 10 may first forward 306 the request for the device (based upon the attribute(s) in the request) to DS 5 based upon, at least in part, DS 5 having a higher probability to resolve the query than DS 1, DS 2, DS 3, and DS 4, then forward 306 the request for the device (based upon the attribute(s) in the request) to DS 2 based upon, at least in part, DS 2 having a higher probability to resolve the query than DS 1, DS 3, and DS 4, then forward 306 the request for the device (based upon the attribute(s) in the request) to DS 3 based upon, at least in part, DS 3 having a higher probability to resolve the query than DS 1, and DS 4, then forward 306 the request for the device (based upon the attribute(s) in the request) to DS 4 based upon, at least in part, DS 4 having a higher probability to resolve the query than DS 1, then forward 306 the request for the device (based upon the attribute(s) in the request) to DS 1 as the last remaining DS node. In some implementations, if the above-noted lower limit of probability has been reached (e.g., for DS 1), discovery process 10 may not forward 306 the request for the device (based upon the attribute(s) in the request) to DS 1. An example chart (e.g., chart 700) in FIGS. 7-8 show similar information from the above-noted queries using the example flood search routing mechanism. In some implementations, regarding the queries, chart 700 shows, e.g., the root node, service, discovered node name, probabilities for each DS node in the distributed architecture, and response times for the queries.

As such, discovery process 10 may allow the searching of heterogeneous devices (and not just homogeneous devices), may be independent of device manufacturer, at least because the DS data store may be created using logical attributes of the devices, may not require reconstruction of the architecture each time a new device is added, and devices and services (and not just devices) may be searched.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method for performing a search routing mechanism comprising:
    receiving, at a first node of a plurality of nodes in a distributed architecture, a request for at least one of a device and a service based upon, at least in part, an attribute of at least one of the device and the service, wherein each of the plurality of nodes maintains an individual probability for each neighbor node for determining a next node to route requests for a specified attribute through the distributed architecture;
    forwarding, from the first node to each neighboring node of the first node, a query to resolve the request;
    determining a probability of each of the neighboring nodes to resolve the query based on the attribute, wherein the neighboring nodes include at least a second node and a third node, wherein determining the probability of the at least a portion of nodes of the plurality of nodes includes:
        determining whether any neighboring nodes of the first node is not associated with an individual score in the first node, and assigning an equal probability to resolve the query to each determined neighboring node;
        determining a probability for each neighboring node of the first node based on individual probabilities maintained by the first node;
        determining that the second node has a higher probability than the third node to resolve queries associated with the attribute; and
    forwarding the request to the second node.

2. The computer-implemented method of claim 1 wherein the search routing mechanism includes a flood search routing mechanism.

3. The computer-implemented method of claim 2 wherein the flood search routing mechanism includes increasing the probability of the second node of at least the portion of nodes of the plurality of nodes to resolve the query based upon, at least in part, a successful response by the second node.

4. The computer-implemented method of claim 2 wherein the flood search routing mechanism includes decreasing the probability of a third node of at least the portion of nodes of the plurality of nodes to resolve the query based upon, at least in part, a failed response by the third node.

5. The computer-implemented method of claim 1 wherein the attribute of the device includes a service offered by the device.

6. The computer-implemented method of claim 1 wherein the attribute of the device includes at least one of a type, a location, a model, and a protocol.

7. The computer-implemented method of claim 1 wherein each respective node of at least the portion of nodes of the plurality of nodes includes a local directory of registered devices to the respective node.

8. A computer program product residing on a computer readable storage medium having a plurality of instructions stored thereon which, when executed across one or more processors, causes at least a portion of the one or more processors to perform operations for performing a search routing mechanism comprising:
  receiving, at a first node of a plurality of nodes in a distributed architecture, a request for at least one of a device and a service based upon, at least in part, an attribute of at least one of the device and the service, wherein each of the plurality of nodes maintains an individual probability for each neighbor node for determining a next node to route requests for a specified attribute through the distributed architecture;
  forwarding, from the first node to each neighboring node of the first node, a query to resolve the request;
  determining a probability of each of the neighboring nodes to resolve the query based on the attribute, wherein the neighboring nodes include at least a second node and a third node, wherein determining the probability of the at least a portion of nodes of the plurality of nodes includes:
    determining whether any neighboring nodes of the first node is not associated with an individual score in the first node, and assigning an equal probability to resolve the query to each determined neighboring node;
    determining a probability for each neighboring node of the first node based on individual probabilities maintained by the first node;
    determining that the second node has a higher probability than the third node to resolve queries associated with the attribute; and
  forwarding the request to the second node.

9. The computer program product of claim 8 wherein the search routing mechanism includes a flood search routing mechanism.

10. The computer program product of claim 9 wherein the flood search routing mechanism includes increasing the probability of the second node of at least the portion of nodes of the plurality of nodes to resolve the query based upon, at least in part, a successful response by the second node.

11. The computer program product of claim 9 wherein the flood search routing mechanism includes decreasing the probability of a third node of at least the portion of nodes of the plurality of nodes to resolve the query based upon, at least in part, a failed response by the third node.

12. The computer program product of claim 8 wherein the attribute of the device includes a service offered by the device.

13. The computer program product of claim 8 wherein the attribute of the device includes at least one of a type, a location, a model, and a protocol.

14. The computer program product of claim 8 wherein each respective node of at least the portion of nodes of the plurality of nodes includes a local directory of registered devices to the respective node.

15. A computing system including one or more processors and one or more memories configured to perform operations for performing a search routing mechanism comprising:
  receiving, at a first node of a plurality of nodes in a distributed architecture, a request for at least one of a device and a service based upon, at least in part, an attribute of at least one of the device and the service, wherein each of the plurality of nodes maintains an individual probability for each neighbor node for determining a next node to route requests for a specified attribute through the distributed architecture;
  forwarding, from the first node to each neighboring node of the first node, a query to resolve the request;
  determining a probability of each of the neighboring nodes to resolve the query based on the attribute, wherein the neighboring nodes include at least a second node and a third node, wherein determining the probability of the at least a portion of nodes of the plurality of nodes includes:
    determining whether any neighboring nodes of the first node is not associated with an individual score in the first node, and assigning an equal probability to resolve the query to each determined neighboring node;
    determining a probability for each neighboring node of the first node based on individual probabilities maintained by the first node;
    determining that the second node has a higher probability than the third node to resolve queries associated with the attribute; and
  forwarding the request to the second node.

16. The computing system of claim 15 wherein the search routing mechanism includes a flood search routing mechanism.

17. The computing system of claim 16 wherein the flood search routing mechanism includes increasing the probability of the second node of at least the portion of nodes of the plurality of nodes to resolve the query based upon, at least in part, a successful response by the second node.

18. The computing system of claim 16 wherein the flood search routing mechanism includes decreasing the probability of a third node of at least the portion of nodes of the plurality of nodes to resolve the query based upon, at least in part, a failed response by the third node.

19. The computing system of claim 15 wherein the attribute of the device includes a service offered by the device.

20. The computing system of claim 15 wherein the attribute of the device includes at least one of a type, a location, a model, and a protocol.

* * * * *